United States Patent [19]

Polaert

[11] Patent Number: 4,769,712
[45] Date of Patent: Sep. 6, 1988

[54] OPTICAL RELAY WHOSE TARGET OPERATES FERROELECTRICALLY

[75] Inventor: Rémy Polaert, Villecresnes, France

[73] Assignee: U.S. Philips Corporation, New York, N.Y.

[21] Appl. No.: 908,120

[22] Filed: Sep. 16, 1986

[30] Foreign Application Priority Data

Sep. 20, 1985 [FR] France .................. 85 13989

[51] Int. Cl.⁴ .................. H04N 5/74; G02F 1/01
[52] U.S. Cl. .................. 358/231; 358/60; 350/353
[58] Field of Search .................. 358/60, 61, 231, 232, 358/236; 350/353

[56] References Cited

U.S. PATENT DOCUMENTS 3,520,589 7/1970 Angel .................. 350/150
3,590,157 6/1971 Korpel .................. 358/231

FOREIGN PATENT DOCUMENTS 1160923 8/1969 United Kingdom .

Primary Examiner—Tommy P. Chin

Attorney, Agent, or Firm—F. Brice Faller

[57] ABSTRACT

An optical relay transmits light in dependence on an electric field parallel to the direction of propagation of the light toward a target having a first face which is scanned by an electron beam. An anode collects the secondary electrons emitted by the beam, and an optically transparent and electrically conducting plate is arranged at the second face of the target, the plate receiving the electric video information signal, thereby forming a control electrode. The target is an electrically insulating material which becomes ferroelectric below a certain temperature, called the Curie temperature, in the proximity of which the optical relay operates. In order to keep the target at the required operating temperature the optical relay is provided with a heat exchanger which acts on the target, such that in normal operation the target has a useful central area where the target exhibits a single domain ferro-electric phase, and a neutral peripheral area at a temperature which is higher than the Curie temperature, where the target exhibits a paraelectric phase. The optical relay is used for the production of television pictures on a large screen.

5 Claims, 4 Drawing Sheets

PRIOR ART

OPTICAL RELAY WHOSE TARGET OPERATES FERROELECTRICALLY

BACKGROUND OF THE INVENTION

The invention relates to an optical relay, which transmits light in dependence on the electric field parallel to the direction of propagation of the light toward a target having a first face which is scanned by means of an electron beam. A anode collects the secondary electrons emitted by the beam, and an optically transparent and electrically conducting plate is arranged at the second face of the target, which plate receives the electric video information signal, thereby forming a control electrode. The target is an electrically insulating material which becomes ferroelectric below a certain temperature, called the Curie-temperature, in the proximity of which the optical relay operates.

Such an optical relay for use in television projectors is described in Patent Specifications FR No. 1 473 212 and FR No. 1 479 284. For a better understanding of the invention, the working principle of the optical relay is described below. More extensive information can be obtained from the documents cited.

The invention relates to the conversion of an electric signal which is variable in time and represents the video information, into a visible picture. It is known that this is one of the functions of a television receiver.

In the display tube of such a receiver the electron beam usually performs the three fundamental functions of this conversion:

f1—the beam supplies the energy to be converted into light: the light output power of the tube is therefore always lower than the power transferred by the beam;

f2—the beam scans the surface of the picture;

f3—the beam applies the video information.

Due to the functions f2 and f3, amongst others, the power of the beam and hence the image brightness cannot be raised to an extent as is required for projection onto a large screen, for example.

For this reason it has been proposed to separate functions and to have the function f1 performed, for example, by an arc lamp and the functions f2 and f3 by a socalled "optical relay". In this case a crystal is used which produces an electrooptical effect, the so-called "Pockels effect". A crystal of double acid potassium phosphate $KH_2PO_4$, hereinafter called KDP, has been found to be suitable.

This effect can be described partially and briefly as follows: when the electrically insulating crystal is subjected to an electric field parallel to its crystal axis c (the three crystal axes a, b and c form a block of three rectangles, in this case, the axis c being the optical axis), the index n of this crystal for light rays in the c direction with linear polarisation in the ab-plane depends upon the direction of said polarisation. To be more precise, if X and Y designate the bisectors of the axes a and b and if the parameters of the crystal with respect to these different directions are designated by the letters used for the directions, the diagram of the indices in the ab-plane forms an ellipse having axes X and Y, instead of forming a circle, and the difference $n_x - n_y$ is proportional to the electric field applied. It follows therefrom that, if the incident light rays are polarised parallel to the axis a, for example, the intensity I of the light passing through an output polariser is $I = I_0 \sin^2 kV$ if the direction of polarisation of this polariser is parallel to the axis b, and $I = I_0 \cos^2 kV$ if the direction is parallel to the axis a, wherein $I_0$ is equal to the intensity of the incident light if no parasitic absorption occurs, and wherein V is the electric potential difference between the two planes of the crystal and k is a coefficient depending upon the crystal material used.

In order to obtain a projected picture by means of a lamp by means of said device, it is sufficient, as stated above, to apply an electric field parallel to the axis c and to cause the value of the field at any point of the target to correspond to the brightness at the corresponding point of the picture to be obtained. For this purpose an electron beam emanating from an electron gun and traversing conventional deflection members scans the target, so that the beam performs the function f2. The function f3, here the control of the electric field, is also performed by the beam in the following manner.

When the electron beams strike the surface of the target, they cause, if their energy remains within suitable limits and in so far as the potential of the anode is sufficiently high, an emission of secondary electrons in an amount which is far greater than that of the incident electrons. This results in an increased electric potential of the point struck, so that the difference in potential between the anode and this point decreases. If the electrons of the beam reach this point in a sufficiently large number, the difference in potential becomes negative and reaches such a value (for example, $-3$ V) that each incident electron emits only one single secondary electron. Thus, the potential of the point is fixed at a limited value with respect to that of the anode. Consequently, taking into account the scanning rate, it suffices if the beam intensity is sufficiently high. As the potential of the anode is constant, each passage of the electron beam fixes, as has been said, the potential of any point A on the struck surface at a value $V_O$ independent of the point and the instant of passage. But the corresponding electric charge produced at the point depends upon the potential of the control electrode situated nearby, at the other side of the target.

If the potential of the electrode at the moment of passage is called VA, the charge is proportional to VO-Va, VA representing the value of the video information signal at the moment of its passage.

The target, whose birefringence depends upon the electric field, is formed by a single crystal of KDP, in which about 95% of the hydrogen is formed by heavy hydrogen (deuterium).

With a given thickness of the crystal, the Pockels effect is proportional to the charges produced on the crystal faces and hence, with a given control-voltage, to the dielectric constant of the crystal. For this reason a target is used of a crystal which becomes ferroelectric beneath a certain temperature, called the Curie temperature, and it is advantageous to use a temperature of a value approaching the Curie temperature because the dielectric constant then attains very high values and the optical relay can function by means of readily obtainable control-voltages (the Pockels effect being proportional to the product $\epsilon V$).

The most frequently used crystals exhibiting this phenomenon are acid salts, notably of the KDP type in the class of the quadratic crystals, the optical axis of which is parallel to the crystal axis c. Its Curie temperature is about $-53°$ C. Below the Curie temperature the DKDP is a quadratic crystal, symmetry class 42 m, and it exhibits a paraelectric behaviour. Below the Curie temperature, the DKDP becomes orthorhombic, symmetry class mm2, and it exhibits a ferroelectric behaviour: a locally spontaneous polarisation and the appearance of ferroelectric domains.

At the ambient temperature, the crystal is anisotropic but in the proximity of the Curie point the anisotropy becomes very important. The change of state is accompanied by sudden variations in the physical properties along the crystal axes:
piezoelectric coefficients
electrooptical coefficients
dielectric constants $\epsilon_x$ and $\epsilon_z$.

In this way the value of the dielectric constant $\epsilon_z$ changes from approximately 60 at the ambient temperature to 30,000 at the Curie temperature.

It is known that from an electrooptical point of view the apparent thickness e of the crystal of DKDP is $$e = 1(\epsilon_x/\epsilon'_z)^{0.5}.$$

The target appears all the more thin as the ratio $\epsilon_x/\epsilon'_z$ is smaller, where $\epsilon'_z$ is the value of $\epsilon_z$ when the crystal is blocked mechanically. As a matter of fact, in an optical relay the monocrystalline plate of DKDP having a thickness 1 close to 250 microns is firmly bonded to a rigid support: a fluorite plate having a thickness of 5 mm.

Consequently, the target of the optical relay is usually cooled to a temperature of approximately $-51°$ C., that is to say a temperature which is slightly higher than the Curie point. Under these conditions $\epsilon_x/\epsilon'_z \simeq 1/9$ and the apparent thickness of the crystal is about 80 microns, which provides the optical relay with a good picture resolution. Below the Curie point, the ratio $\epsilon_x/\epsilon'_z$ is still smaller which substantially improves the picture resolution.

So far it has not been possible to project television pictures by means of a target which is cooled to a temperature below its Curie temperature. As a matter of fact, due to the change of state ferroelectric domains appeared systematically which produced a great number of vertical and horizontal bright lines on the projection screen which are disorderly arranged across the picture. These domains correspond to zones having a different atomic arrangement.

SUMMARY OF THE INVENTION

It is an object of the invention to provide an optical relay which operates just below the Curie temperature of the target, so that the quality of the final picture does not deteriorate due to disorderly arranged bright lines. To keep the target at the required temperature during operation, the optical relay is provided with a heat sink which acts on the target such that in normal operation the target is formed of:
an effective central area where the target exhibits a single domain ferroelectric phase, and
a neutral peripheral area at a higher temperature than the Curie temperature, where the target exhibits a paraelectric phase.

When comparing the ratio $\epsilon_x/\epsilon'_z$ in the paraelectric phase and in the ferroelectric phase it will be found that it is possible to improve the intrinsic resolution of the target by making it operate in the ferroelectric state.

Applicants have shown the advantage of operating at a temperature below the Curie point, the ratio $\epsilon_x/\epsilon'_z$ becoming much smaller, because this substantially improves the picture resolution of the optical relay. Typically, at a spatial frequency of 1000 points per line and a nominal beam current of 60 $\mu$A, the contrast of 11% at the normal operating temperature ($-51°$ C.,) reaches 24% over a range of about ten degrees (from $-63°$ C. to $-53°$ C.) when the temperature of the target is lower than the Curie point.

In accordance with the usual method of construction the rectangular target of KDP is bonded to a fluorite plate which is a suitable heat conductor. Said fluorite plate is set in a ring-shaped copper frame which produces a cold transfer and which is mounted on Peltier-effect refrigerating elmenets.

In this way the target is cooled in a centripetal way: the corners of the target of KDP are the first to reach the Curie temperature, followed by the edges; a "cold circle" is formed which marks the boundary of the two stages, paraelectric at the centre and ferroelectric at the circumference. In the meantime, bright demarcation lines which have already been observed between the many ferroelectric domains appear in the circumferential area which has become ferroelectric. These lines originate from microscopically small but inevitable imperfections in the edges of the target of KDP.

Consequently, it is an object of the invention to make the cold spread out from the centre of the target and to prevent the cold circle from reaching the edges of the target in order to obtain a crystal which is ferroelectric at the centre and paraelectric at the periphery. Consequently, the centre, which is the useful area for the projection of the image, is single domain ferroelectric. As long as the central ferroelectric area remains surrounded by a paraelectric circumferential area this condition will remain stable.

In accordance with a first embodiment cooling of the target via the centre is obtained, whilst safeguarding the optical properties of the centre for the projection of the picture, by forming a deep circumferential groove in the fluorite plate, thereby substantially lengthening the thermal path between the copper frame and the periphery of the target of KDP.

In accordance with a second embodiment the fluorite support is formed of two pieces of cut and polished fluorite, one of which has a bevelled edge and which are positioned one on top of the other by way of the central part.

In accordance with a third embodiment, the fluorite support is cut, polished and provided with a bevelled edge in order to form a flat surface having a smaller dimension.

BRIEF DESCRIPTION OF THE DRAWING
limitative examples and which represent.

DETAILED DESCRTPTION OF THE PREFERRED EMBODIMENTS

Figure 1:
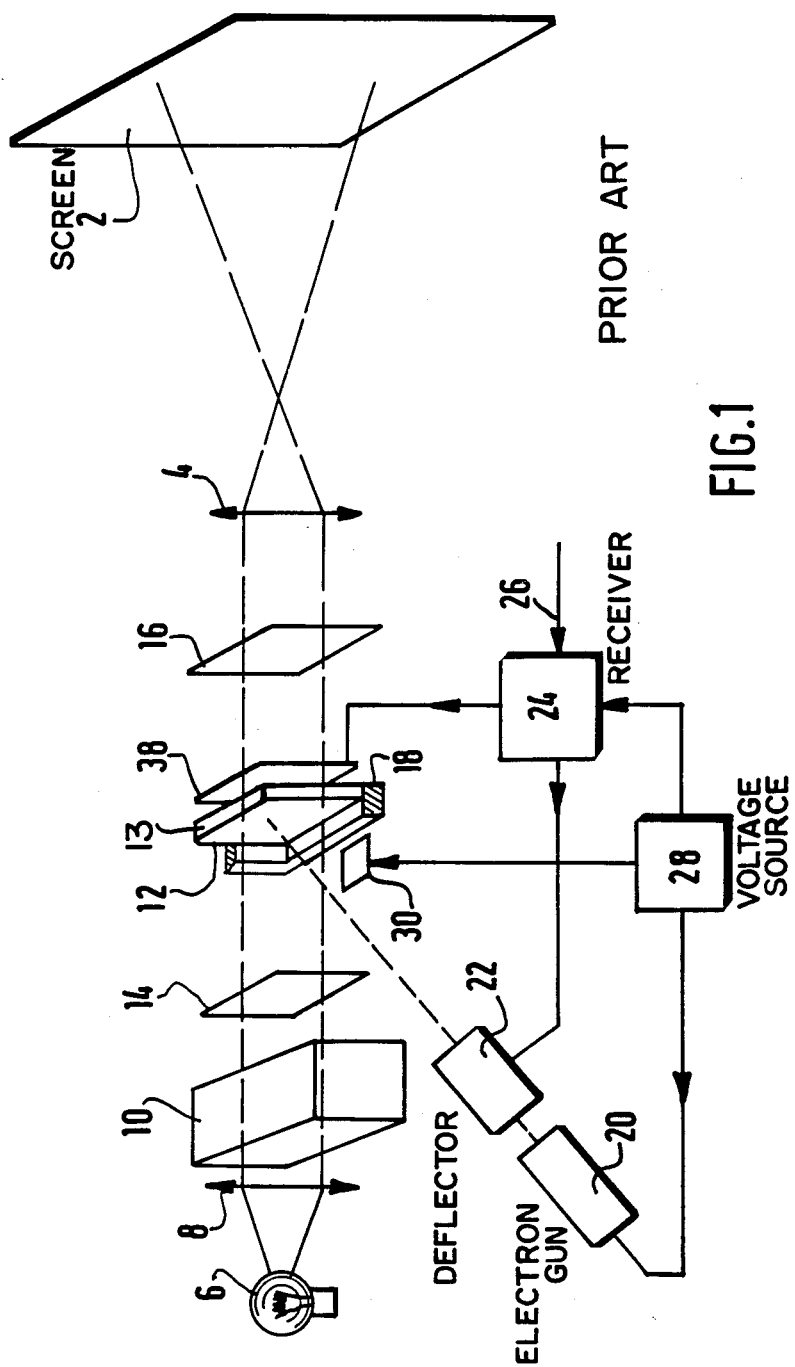
FIG. 1: a schematic perspective view of the prior art optical relay.

FIG. 1 shows diagrammatically the essential elements of an optical relay according to the invention and the members cooperating therewith for reproducing a visible picture on a screen 2 through a projection lens 4. The light is applied by a lamp 6, showing as an incandescent lamp although other types of lamps may be employed. The light passes through a collimator lens 8, then a space 10 serving for suppressing the infrared caloric radiation. The optical relay is formed essentially by a target 12 consisting of a parallele pipedal single crystal of KDP, the optical axis (c) of which is at right angles to the major faces; this crystal is arranged on a heat sink 13 between two crossed polarisers 14 and 16, the polarisation planes of which are parallel to the two further crystal axes (a and b) of the single crystal. Cold transfer means in the form of copper frame 18 is connected with the heat sink 13 which is thus held approximately at its Curie temperature. The copper frame 18 and heat sink 13 are elements of a heat exchanger. An electron beam is directed to the left-hand face of the target, this beam is indicated by a broken line and emanates from an electron gun 20. This beam scans periodically the whole useful surface of the target 12 by means of deflection means in the form of deflector 22 which is controlled by scanning signals from a receiver 24. The scanning signals are generated by means of the synchronising signals and the actual video signals which the receiver receives at input 26. A unit 28 supplies the required direct voltages for some of these elements and for an anode 30. For the sake of clarity the anode is represented by a plate parallel to the light beam; this arrangement, of course, allows free passage of light, but it is not so effective for the collection of secondary electrons emanating from all points of the surface of the target 12 struck by the electron beam. In practice, the anode is therefore arranged parallel to the surface of the target 12 and in close vicinity thereof. Since the incident electron beam and the light must traverse the anode, the latter is constructed in the form of a grid. A plate 38 which is electrically conductive and optically transparent, and which is formed, for example, by a thin gold layer, is provided behind the target 12. The receiver 24 applies the video information signal to this plate.

Figure 2:
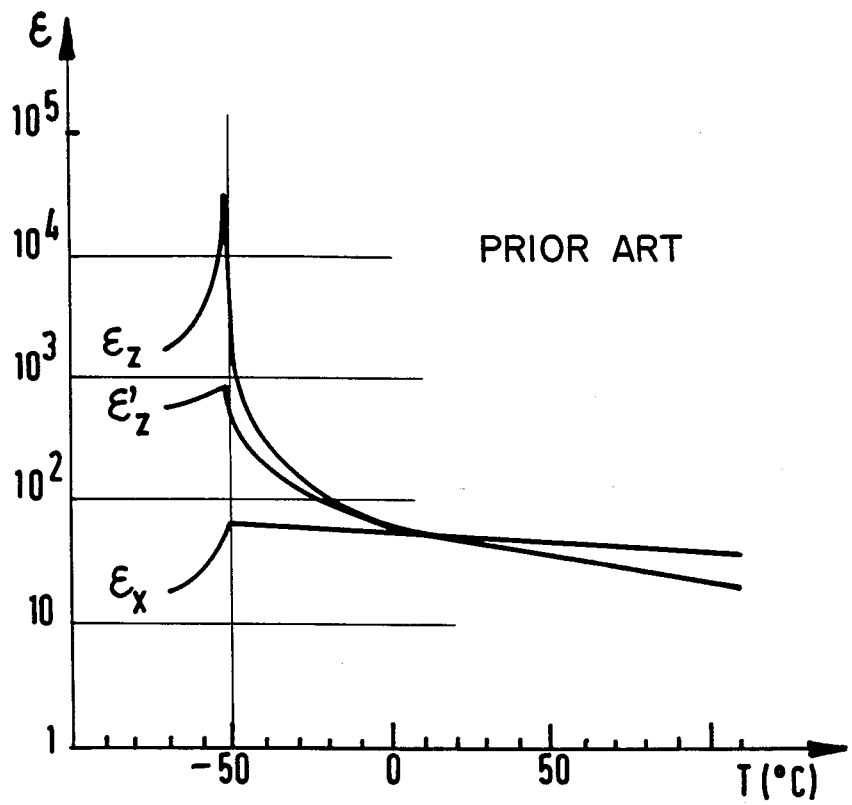
FIG. 2: the curves of the variation of the dielectric constants $\epsilon_x$, $\epsilon_z$, $\epsilon'_z$ as a function of the temperature.

FIG. 2 represents the variations of $\epsilon_x$, $\epsilon_z$, $\epsilon'_z$ as a function of the temperature. It has been found that the change from the ferro-electric phase to the paraelectric phase produces sudden variations of the properties of the target and that the heat exchanger must provide a very precise thermal situation.

Figure 3:
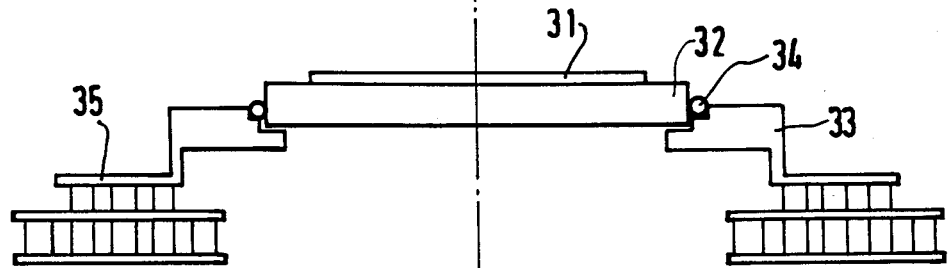
FIG. 3: a sectional view of the prior art mounting of the target on the cooling elements.

FIG. 3 shows a sectional view of the mounting of the target 31 on the cooling elements 35 in accordance with the prior art.

The target 31 of KDP measuring 30×40 mm is bonded to a fluorite plate 32 having a thickness of 5 mm and a diameter of 50 mm. Said fluorite plate, which is a suitable heat conductor ($360.10^{-4}$ cal/cm/sec/degree) is set in a copper frame 33 by means of a metallic joint 34, for example, an indium thread. Consequently, cooling of the target 31 by means of cooling elements 35 is carried out in a centripetal way. The formation of ferroelectric domains is carried out from the periphery where many domains are formed on microscopic defects of the crystal. These domains advance towards the centre where they merge to form larger domains, but they are still relatively numerous. The boundaries of the domains then become bright lines having a disorganised structure.

Figure 4:
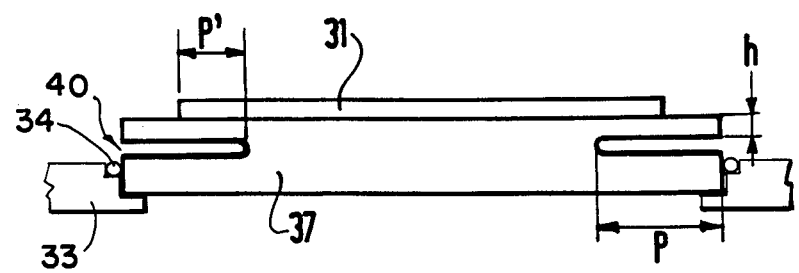
FIG. 4: a sectional view of the target mounted on a heat sink in accordance with a first embodiment of the invention.
Figure 5:
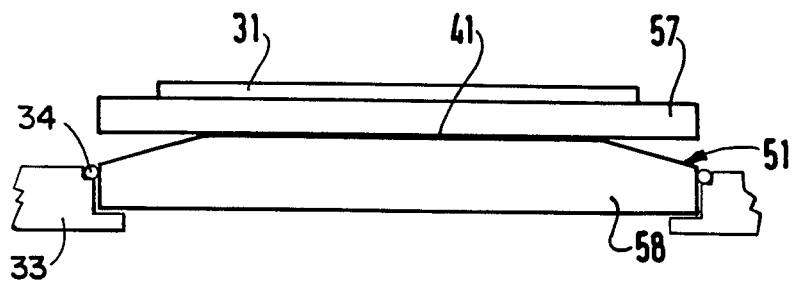
FIG. 5: a sectional view of the target mounted on a heat sink in accordance with a second embodiment of the invention.
Figure 6:
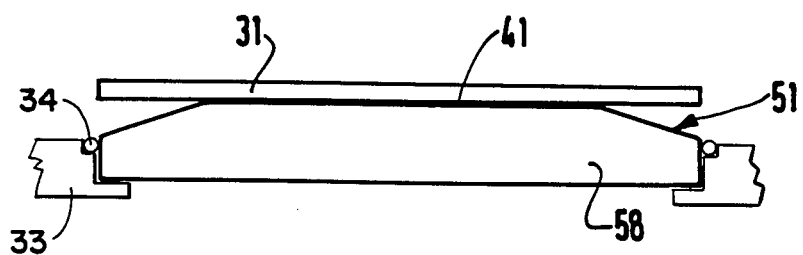
FIG. 6: a sectional view of the target mounted on a heat sink in accordance with a third embodiment of the invention.

FIG. 4 represents a heat exchanger in accordance with the invention. It has been conceived to make the cold advance from the center of the target 31. When the temperature sinks below the Curie temperature, a ferroelectric domain appears in the vicinity of the center of the target. As the cold advances from the center towards the exterior, this unique domain develops towards the periphery of the target 31. If the advance in the direction of the periphery of this unique domain was not stopped, it would break up into a large number of smaller domains by the time it reached the periphery. To prevent this from happening, the construction of the heat sink 37, taking into account the cold flux it receives, makes it possible to sustain a paraelectric area at the periphery of the target. This paraelectric area precludes the division of the central single domain. For this reason the heat sink 37 on which the target 31 is positioned is preferably made of a circular fluorite plate at the periphery of which a round groove 40 having a depth p is formed. Groove 40 is formed at a distance h from the face supporting the target 31. After the formation of the groove, the fluorite plate 37 has a diameter d in the plane of groove 40. For the groove to be situated entirely below the target, the diameter d must be smaller than the smallest l of the dimensions )(L, l) of the target 31 which is generally rectangular. Thus, the target 31 projects laterally from the diameter d for a distance $$p' = \frac{1-d}{2}.$$

The distances p and p' must be greater than the distance h.

A satisfactory exemplary embodiment has the following characteristics:.
the diameter of the fluorite plate is 50 mm
the thickness of the fluorite plate is 5 mm
the depth of the groove is 10 mm
the length of the groove is 1 mm
d=30 mm
h=1 mm
the target is formed of a disc having a diameter of 45 mm, where p'=7.5 mm, and p=10 mm or p/h=10, p'/h=7.5.

In accordance with a second embodiment the fluorite support is formed of two plates 57 and 58 which are bonded by means of an adhesive 41. The first plate 57 is circular with parallel faces. The second circular plate has parallel faces and is provided with a bevelled edge 51 on the face situated at the side contiguous to the plate 57. The bevelled edge 51 serves the same purpose as the circular groove of the preceding embodiment. Consequently, it extends below the target of KDP.

In accordance with a third embodiment the fluorite support is formed of only a plate 58, as has been described above.

In the three embodiments which have been described above, the bonding of the target to the support or of the plates 57 and 58 to each other is carried out by means of an optical adhesive 48 which can be polymerised by UV exposure.

An optical relay in accordance with the invention is used, in particular, for projecting television pictures on a large screen.

What is claimed is:

1. An optical relay which transmits light in dependence on an electric field parallel to the direction of propagation of the light, said relay comprising
   a target of electrically insulating material which becomes ferroelectric below a certain temperature, called the Curie temperature, in the proximity of which the optical relay operates, said target having said first face and an opposed second face,
   means for scanning said first face of said target with an electron beam,
   an anode for collecting electrons emanating from the first face of the target in response to the electron beam,
   a heat sink having a first face, an opposed second face, and a circumferential area extending therebetween, said first face of said heat sink being disposed against the second face of said target,
   cold transfer means in contact with said heat sink along the circumference of its second face and the adjacent portion of its circumferential area, said cold transfer means being effective to cool said target via said heat sink,
   means for assuring that a central area of said target is cooled before the corresponding peripheral area thereof, whereby
   as the temperature of the heat sink is lowered by said cold transfer means, said central area of said target will fall below the Curie temperature before said peripheral area, so that a ferroelectric domain can be formed in said central area while a paraelectric domain is sustained in said peripheral area and the advance of the ferroelectric domain into the peripheral area can be stopped before it breaks up into smaller domains.

2. An optical relay as claimed in claim 1, wherein said heat sink comprises fluorite plate means, said means for assuring that a central area of the target is cooled before the corresponding peripheral area comprising a circumferential groove extending into said circumferential area at a distance h from said first face of said heat sink, said groove extending behind said target over a distance p'.

3. An optical relay as in claim 2, wherein p' is larger than h.

4. An optical relay as in claim 2, wherein said fluorite plate means comprises a first fluorite plate bonded to a second fluorite plate, one of said plates having a circumferential bevelled edge facing the other plate to form said circumferential groove.

5. An optical relay as in claim 1, wherein said heat sink is a fluorite plate having a bevelled edge on said first face, said bevelled edge marking off said central area.

* * * * *